United States Patent
Chang

(10) Patent No.: US 7,011,754 B2
(45) Date of Patent: Mar. 14, 2006

(54) FILTERING DEVICE HAVING FILTER BAG SEAL

(75) Inventor: I-Chung Chang, Chong Ho (TW)

(73) Assignee: UFF Internation Corp.

( * ) Notice: Subject to any disclaimer, the term of this patent is extended or adjusted under 35 U.S.C. 154(b) by 146 days.

(21) Appl. No.: 10/185,216

(22) Filed: Jun. 25, 2002

(65) Prior Publication Data

US 2003/0234215 A1   Dec. 25, 2003

(51) Int. Cl.
*B01D 29/35* (2006.01)

(52) U.S. Cl. ............... 210/315; 210/342; 210/435; 210/445; 210/448; 210/450; 210/451; 210/452; 210/453; 210/455; 210/474; 210/477

(58) Field of Classification Search ........... 210/342, 210/435, 445, 448, 450, 451, 453, 455, 497.01, 210/499, 315, 452, 474, 477
See application file for complete search history.

(56) References Cited

U.S. PATENT DOCUMENTS

| 3,814,261 | A | * | 6/1974 | Morgan, Jr. | 210/453 |
| 3,959,137 | A | * | 5/1976 | Kirsgalvis | 210/474 |
| 4,259,188 | A |   | 3/1981 | Morgan | 210/448 |
| 4,539,116 | A | * | 9/1985 | Morin | 210/445 |
| 5,137,632 | A | * | 8/1992 | Morgan, Jr. | 210/452 |

* cited by examiner

*Primary Examiner*—David A Reifsnyder
(74) *Attorney, Agent, or Firm*—Charles E. Baxley

(57) ABSTRACT

A filtering device includes a container, a cover attached on top of the container having a space communicating with an inlet opening and a chamber of the container, and a filter screen received in the container for filtering the fluid from the inlet opening to the chamber of the container. The filter screen includes an upper peripheral flange having a peripheral wall or a peripheral flap for making an excellent seal between the container and the cover. The space of the cover includes a changing volume for decreasing the flowing speed of the fluid.

4 Claims, 6 Drawing Sheets

FILTERING DEVICE HAVING FILTER BAG SEAL

BACKGROUND OF THE INVENTION

1. Field of the Invention

The present invention relates to a filtering device, and more particularly to a filtering device having a filter bag seal for facilitating the sealing of the filtering device.

2. Description of the Prior Art

Typical filtering devices may be used for filtering various kinds of objects, such as the particles or the fluids, and include a container having an inlet opening for receiving the objects, and one or more filtering screens for receiving and filtering the objects. It is important that a complete seal is formed between the container and the filter screens. However, the seal between the container and the filter screens of the typical filtering device may not be maintained in the excellent sealing condition all the time, such that the objects after filtering operations may be mixed, some times, with the objects that have not been filtered by the filter screens.

U.S. Pat. No. 4,259,188 to Morgan discloses a fluid filter housing having a filter bag lip forced into sealing engagement with the housing rim by the housing cap to form a fluid tight seal. However, the housing cap may not be easily disengaged from the filter housing, and the filter bag thus also may not be easily disengaged from the filter housing for cleaning or replacing purposes.

The present invention has arisen to mitigate and/or obviate the afore-described disadvantages of the conventional filtering devices.

SUMMARY OF THE INVENTION

The primary objective of the present invention is to provide a filtering device including a filter bag seal for facilitating the sealing of the filtering device.

The other objective of the present invention is to provide a filtering device for decreasing the flowing speed of the objects and for allowing the objects to be suitably filtered by the filtering device.

In accordance with one aspect of the invention, there is provided a filtering device comprising a container including a chamber formed therein, and including an inlet opening formed therein, a cover attached on top of the container, and including a space formed therein and communicating with the inlet opening and the chamber of the container, for allowing a fluid to be filtered to flow from the inlet opening to the chamber of the container, and a filter screen received in the chamber of the container, for receiving and filtering the fluid from the inlet opening of the container.

The filter screen includes an upper portion having a peripheral flange extended radially outward therefrom and disposed between the container and the cover.

The peripheral flange includes a peripheral wall extended therefrom and a peripheral bulge provided on top of the peripheral wall for engaging between the container and the cover.

The peripheral flange includes an upper portion having a peripheral flap extended therefrom for engaging with the cover.

The container includes an upper portion having a peripheral shoulder formed therein and provided around the chamber thereof for receiving the peripheral flange of the filter screen.

The container includes an upper portion having a peripheral shoulder formed therein and provided around the chamber thereof, the filtering device further includes a filter barrel received in the chamber of the container, the filter barrel includes an upper portion having a peripheral rib extended radially outward therefrom and engaged in the peripheral shoulder of the container, the filter screen is received in the filter barrel.

The space of the cover includes a first end having a smaller area and communicating with the inlet opening of the container, and a second end having a greater area and communicating with the chamber of the container, for decreasing a flowing speed of the fluid flowing from the first end to the second end of the space of the cover.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
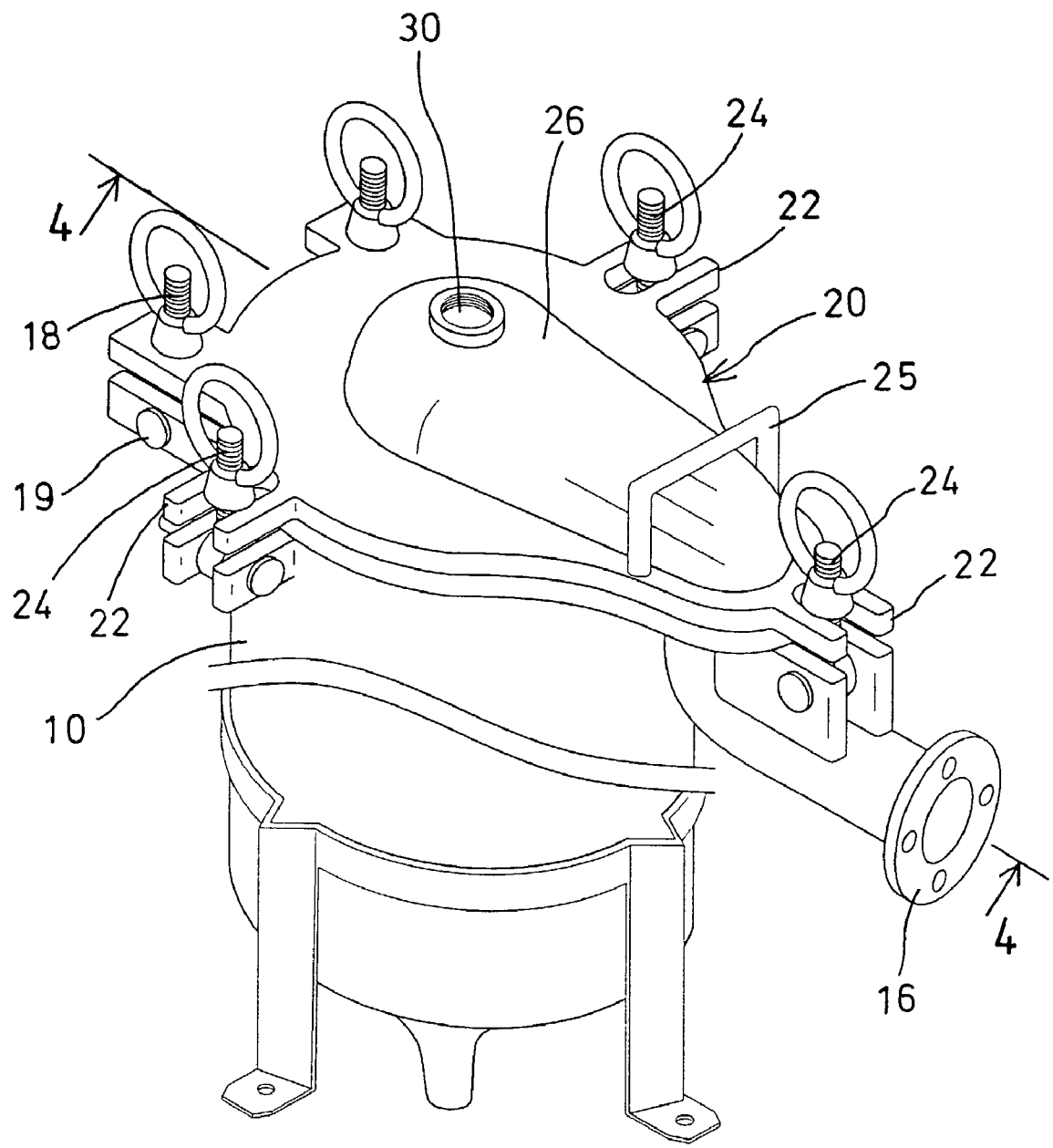
FIG. 1 is a perspective view of a filtering device in accordance with the present invention in which the cover of the filtering device is enclosed.

Referring to the drawings, and initially to FIGS. 1–4, a filtering device in accordance with the present invention comprises a container 10 including a chamber 11 formed therein for receiving the objects or the fluid to be filtered, and including one or more, such as two concentric peripheral shoulders 12, 17 formed in the upper portion thereof and formed around the chamber 11 of the container 10. In which the peripheral shoulder 12 of the container 10 includes an outer diameter greater than that of the other peripheral shoulder 17. The container 10 includes a peripheral groove 13 formed in the upper and outer peripheral portion thereof for receiving a sealing ring 14 therein.

The container 10 further includes an inlet opening 15 formed therein, and a pipe 16 for coupling the inlet opening 15 to the reservoir (not shown) that is provided for receiving the fluid to be filtered by the filtering device, and for allowing the fluid to flow into the chamber 11 of the container 10 via the inlet opening 15 of the container 10. One or more fasteners 18 are pivotally or rotatably secured to the upper and outer peripheral portion of the container 10 with one or more pivot axles 19. The inlet opening 15 and the chamber 11 of the container 10 are located within the area formed or defined by the sealing ring 14 and the peripheral groove 13 of the container 10.

A cover 20 has one end, such as the rear end, pivotally or rotatably secured to the upper and outer peripheral portion of the container 10 with one or more of the fasteners 18 and pivot axles 19, for allowing the cover 20 to be rotated relative to the container 10 about one or more of the pivot axles 19. The cover 20 includes one or more pairs of fingers 22 extended from the sides or the front portion thereof and each having a slot 23 formed or defined between each pair of the fingers 22. One or more fasteners 24 may further be provided and pivotally secured to the container 10, and may be engaged into the slots 23 of the respective pairs of fingers 22, for detachably securing the cover 20 to the top of the container 10. The cover 20 includes a handle 25 attached to the front portion thereof for rotating and opening the cover 20 relative to the container 10 about the pivot axles 19.

Figure 3:
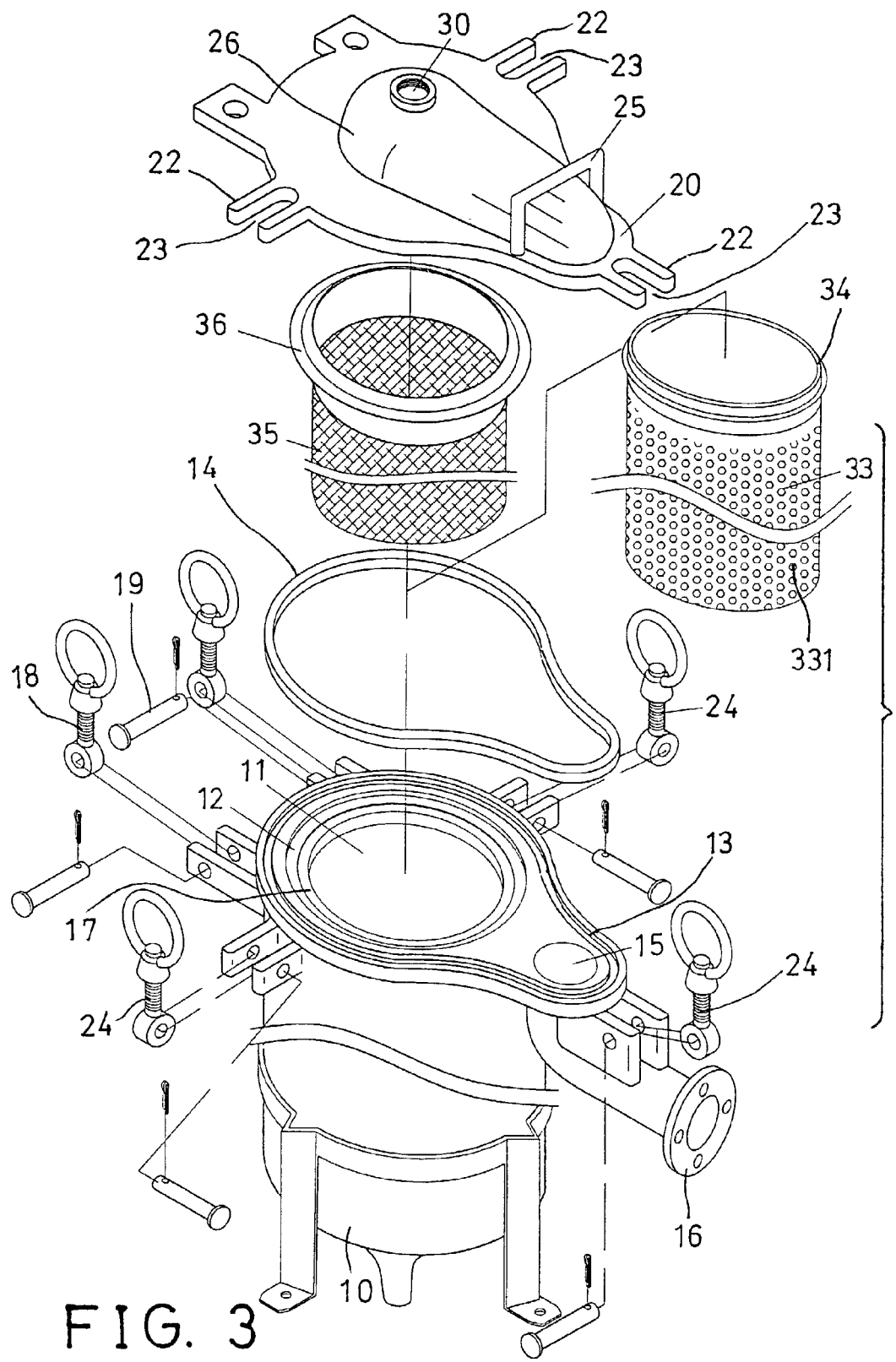
FIG. 3 is a partial exploded view of the filtering device.
Figure 6:
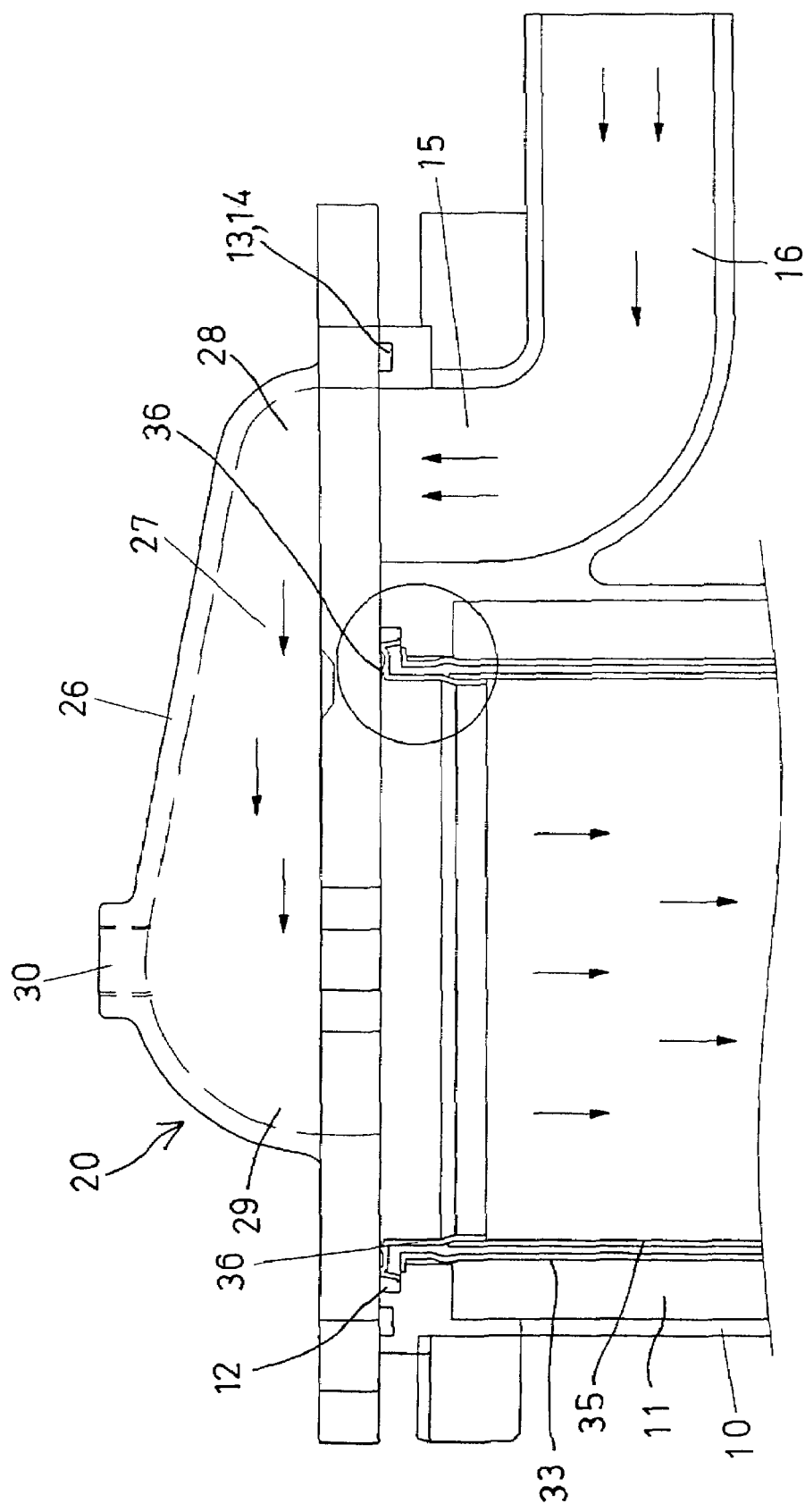
FIG. 6 is a partial cross sectional view similar to FIG. 4, illustrating the operation of the filtering device.

The cover 20 includes a casing 26 formed or provided therein, such as extended upward therefrom for forming a space 27 therein, best shown in FIGS. 3 and 6, and communicating with the inlet opening 15 and the chamber 11 of the container 10, such that the fluid from the pipe 16 may flow through the space 27 of the cover 20 and may then flow into the chamber 11 of the container 10.

The cover 20 includes one end 28 having a smaller area or volume and aligned with the inlet opening 15 of the container 10, and the other end 29 having a greater area or volume and aligned with the chamber 11 of the container 10.

It is to be noted that the fluid flowing from the pipe 16 and flowing through the inlet opening 15 of the container 10 may include a great flowing speed, because the fluid is normally pressurized for supplying to the pipe 16.

When the fluid flowing from the smaller end 28 to the greater end 29 of the cover 20, the flowing speed of the fluid may be reduced or decreased from the smaller end 28 to the other greater end 29 of the cover 20.

A pressure relief valve and/or a pressure gauge 31 (FIG. 4) may be provided and coupled to a mouth 30 of the cover 20 for pressure relieving purposes, and/or for detecting the pressure of the fluid within the space 27 of the cover 20.

A filter barrel 33 is received in the chamber 11 of the container 10, and includes a number of orifices 331 formed therein, and includes a peripheral rib 34 extended radially outward from the upper peripheral portion thereof for engaging with the peripheral shoulder 17 of the container 10 (FIG. 5), and for retaining the filter barrel 33 within the container 10. A filter screen 35 may further be provided and received in the filter barrel 33, and includes a peripheral flange 36 extended radially outward from the upper peripheral portion thereof for engaging with the other peripheral shoulder 12 of the container 10 (FIG. 5), and for retaining the filter screen 35 within the filter barrel 33 and the container 10.

Figure 2:
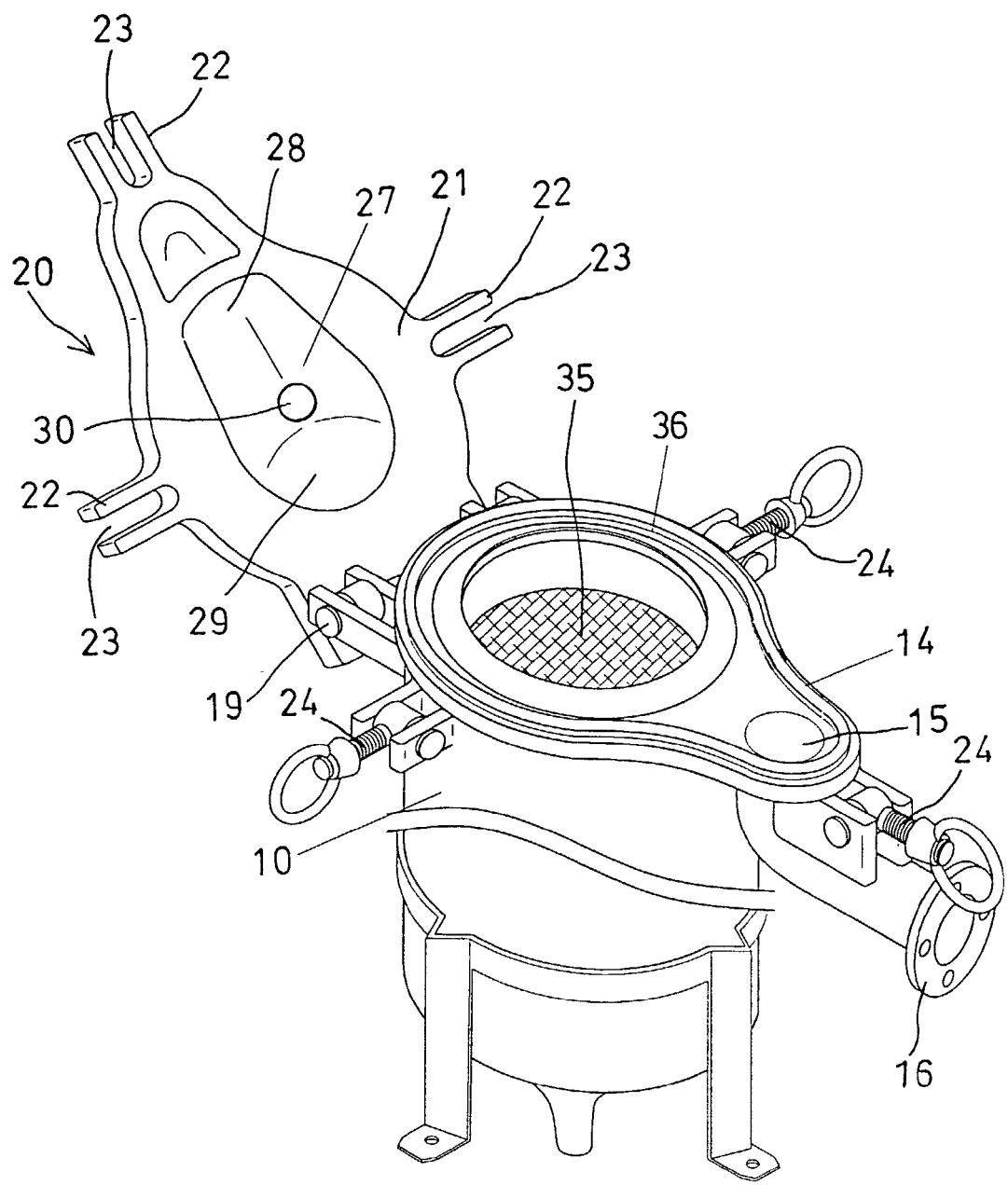
FIG. 2 is a perspective view similar to FIG. 1, in which the cover of the filtering device is opened.
Figure 4:
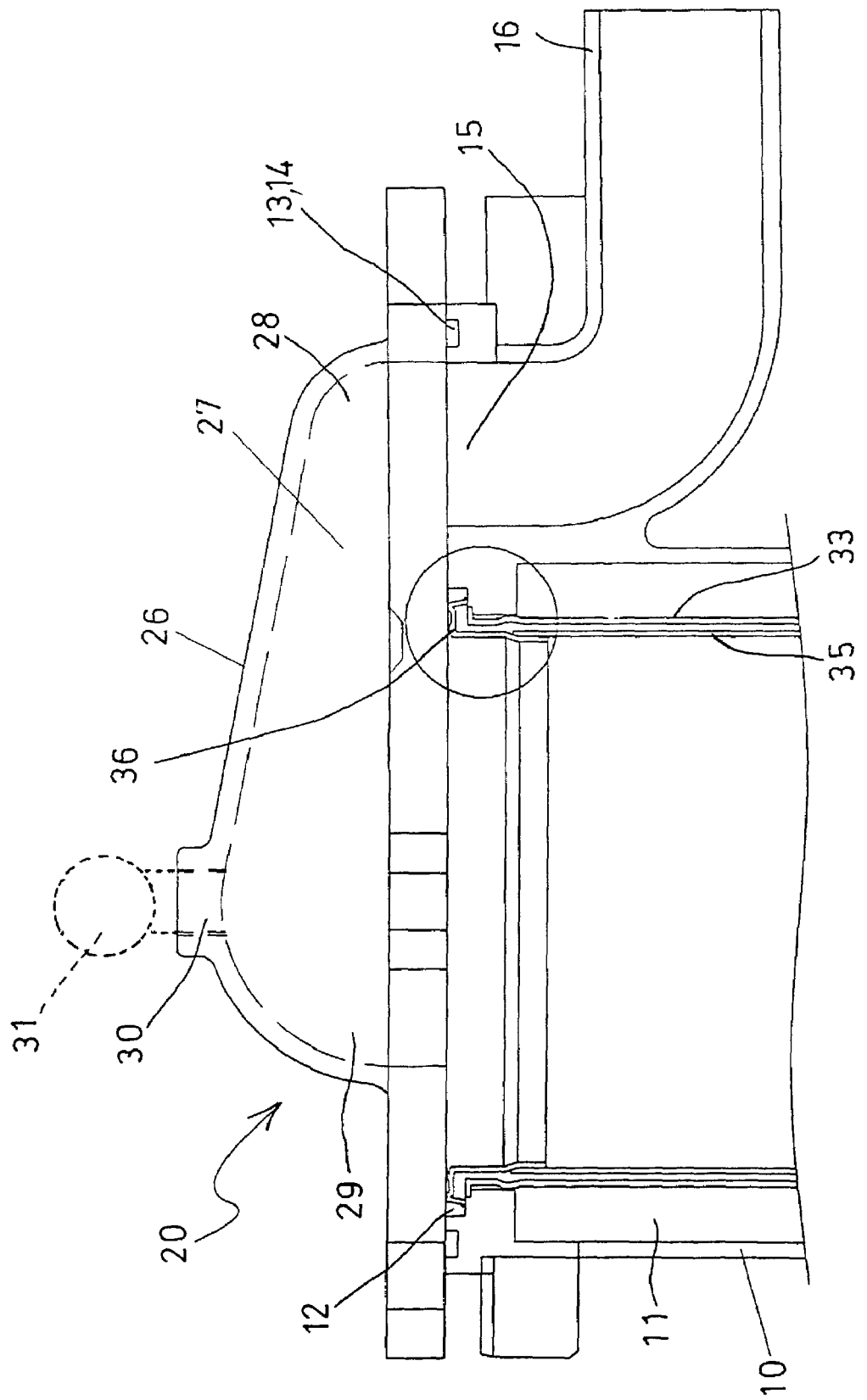
FIG. 4 is a partial cross sectional view taken along lines 4—4 of FIG. 1.
Figure 5:
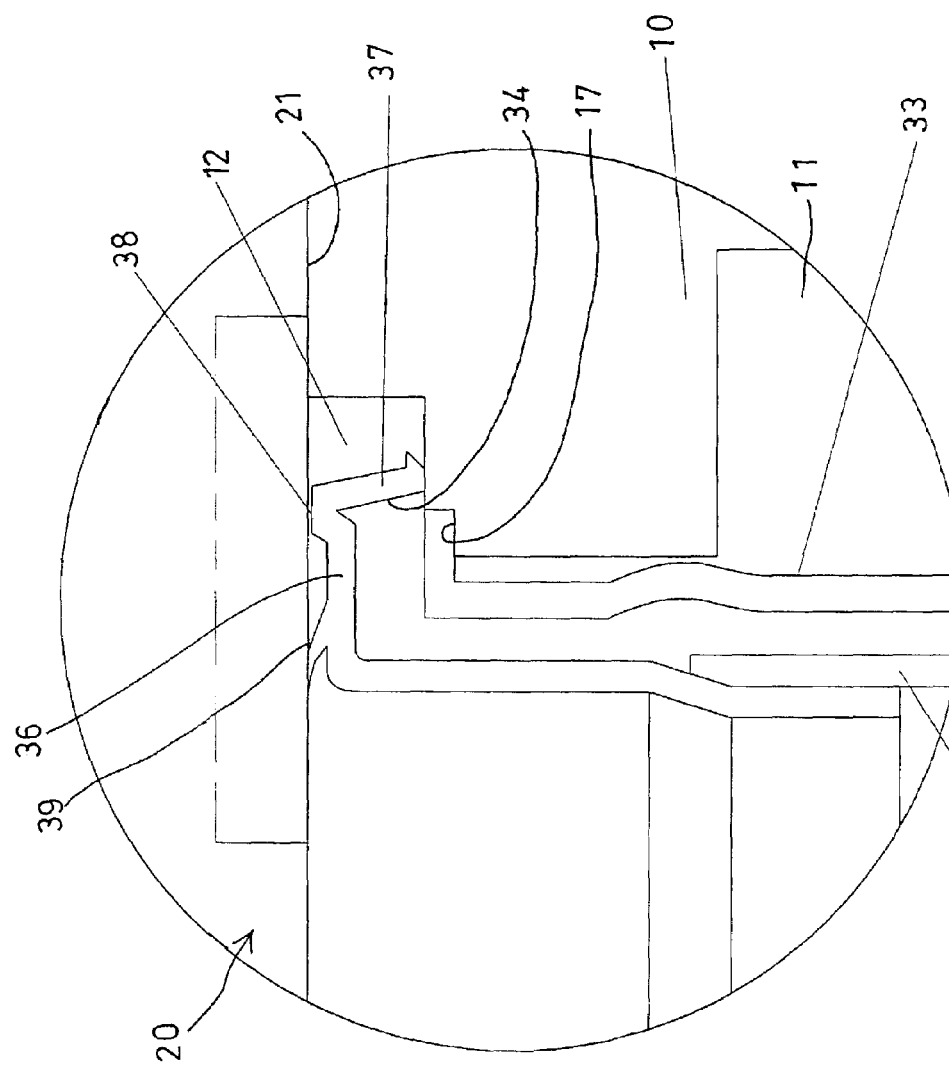
FIG. 5 is an enlarged partial cross sectional view of the filtering device.

As best shown in FIGS. 4–6, the filter screen 35 further includes a peripheral wall 37 extended downward and outward from the outer peripheral portion of the peripheral flange 36 thereof, for resiliently engaging with the container 10, and includes a peripheral bulge 38 formed and provided on the upper portion of the peripheral wall 37, or formed between the peripheral wall 37 and the peripheral flange 36 of the filter screen 35 for engaging with the inner surface 21 of the cover 20 (FIGS. 2, 5). The filter screen 35 may further include a peripheral flap 39 extended radially inward and upward for engaging with the inner surface 21 of the cover 20 (FIGS. 2, 5), and for making an excellent seal between the peripheral flange 36 of the filter screen 35 and the cover 20.

In operation, as shown in FIG. 6, the fluid flowing from the pipe 16 may flow from the smaller end 28 to the greater end 29 of the cover 20, and the flowing speed of the fluid may be reduced or decreased from the smaller end 28 to the other greater end 29 of the cover 20, such that the fluid may flow into the filter screen 35 and the filter barrel 33 with a smaller flowing speed, and such that the fluid may be suitably filtered by the filter screen 35 and the filter barrel 33.

The engagement of the peripheral flange 36 and/or the peripheral bulge 38 and/or the peripheral flap 39 with the cover 20 makes an excellent seal between the container 10 and the cover 20, and may prevent the fluid from flowing into the filter screen 35 and the filter barrel 33 via the other places or positions other than the space 27 of the cover 20.

Accordingly, the filtering device in accordance with the present invention includes an excellent seal for facilitating the sealing of the filtering device, and includes a structure for decreasing the flowing speed of the objects and for allowing the objects to be suitably filtered by the filter screen and/or the filter barrel of the filtering device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A filtering device comprising:
   a container including a chamber formed therein, and including an inlet opening formed therein,
   a cover attached on top of said container, and including a space formed therein and communicating with said inlet opening and said chamber of said container, for allowing a fluid to be filtered to flow from said inlet opening to said chamber of said container,
   a filter screen received in said chamber of said container, for receiving and filtering the fluid from said inlet opening of said container, said filter screen including an upper portion having a peripheral flange extended radially outward therefrom and disposed between said container and said cover, said peripheral flange including a peripheral wall extended therefrom, and including a peripheral bulge provided on top thereof for engaging between said container and said cover, and further including a peripheral flap extended on top thereof for engaging with said cover.

2. The filtering device according to claim 1, wherein said container includes an upper portion having a peripheral shoulder formed therein and provided around said chamber thereof for receiving said peripheral flange of said filter screen.

3. The filtering device according to claim 1, wherein said container includes an upper portion having a peripheral shoulder formed therein and provided around said chamber thereof, said filtering device further includes a filter barrel received in said chamber of said container, said filtering barrel includes an upper portion having a peripheral rib extended radially outward therefrom and engaged in said peripheral shoulder of said container, said filter screen is received in said filtering barrel.

4. The filtering device according to claim 1, wherein said cover includes a first end having a smaller area communicating with said inlet opening of said container, and a second end having a greater area and communicating with said chamber of said container, for decreasing a flowing speed of the fluid flowing from said first end to said second end of said cover.

* * * * *